April 19, 1955 A. J. ROUBAL 2,706,656

SEALING DEVICE FOR BALL AND ROD MILLS

Filed June 12, 1951

Inventor
Alexander J. Roubal
by Wayne B. Easton
Attorney

United States Patent Office 2,706,656
Patented Apr. 19, 1955

2,706,656

SEALING DEVICE FOR BALL AND ROD MILLS

Alexander J. Roubal, Milwaukee, Wis., assignor to Allis-Chalmers Manufacturing Company, Milwaukee, Wis.

Application June 12, 1951, Serial No. 231,126

2 Claims. (Cl. 288—23)

The present invention relates to sealing devices and particularly to a device for sealing bolt holes in ball and rod mill casings.

In comminuting machinery of the ball and rod mill type having linings composed of individual lining members, it has been a problem to suitably seal bolt holes in the casings of such mills through which bolts for attaching the individual lining members extend. In wet grinding operations the mills are partially filled with water which tends to leak out of the bolt holes and this is a sealing problem to which the present invention pertains.

Another problem to which the present invention pertains is that of providing a suitable sealing or obturator device for preventing the escape of finely ground particles from a ball or rod mill during dry grinding operations. This problem is especially important from the standpoint of the health of people working in the vicinity of the mill when the material being ground contains silica.

An object of the present invention is to provide an improved sealing arrangement for a bolt hole which allows a threaded bolt extending through the hole to move relative thereto.

Another object of the invention is to provide an improved sealing arrangement for bolt holes formed in a curved surface.

The above and still further objects and advantages, which will be apparent from a reading of this specification, can best be carried into practical effect as described hereinbelow with reference to the accompanying drawing in which.

Figure 1:
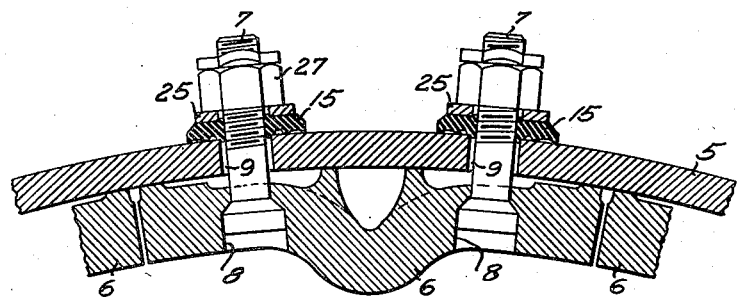
Fig. 1 is a vertical, transverse, sectional view of a portion of a ball or rod mill casing and liner embodying the new and improved sealing device.

The type of ball or rod mill to which the present invention is especially applicable comprises a cylindrical or conical casing 5 within which material is reduced by impact and abrasion with freely tumbling comminuting bodies. The interior of casing 5 is protected by a lining comprising a plurality of liner members 6, the general form or shape of which is capable of considerable modification. The liner members 6 are attached to casing 5 by means of a plurality of threaded bolts 7 which respectively extend through holes 8 in the liner member and holes 9 in the casing.

Concentrically disposed on bolt 7 is a resilient, annular sealing or obturator element 15 of rubber or other resilient-like material. Sealing element 15 has a generally disk like shape with a central aperture 16 slightly larger than the threaded portion of bolt 7 and slightly smaller than casing hole 9. The upper side of element 15 has an annular bearing surface 17 shown as a flat surface but which is capable, within the scope of the invention, of being modified. The peripheral portion of element 15 is shown as having a downwardly extending skirt portion 18 which may be modified to some degree or, in some instances, be omitted, as will appear hereinafter. Surrounding the wall of the central aperture, on the lower side of element 15, is a downwardly extending annular ridge or collar-like wall extension 19 and radially adjacent thereto is an annular recess 20. Extending in a radially outward direction from recess 20 in casing-opposed relation is a flat or generally planar annular bearing surface 21 which has an axial position between the crest of ridge 19 and the bottom of recess 20.

Concentrically disposed on bolt 7 in abutting relation to sealing element 15 is a rigid, disk like washer 25 of metal or other like material. Washer 25 has a central opening 26 which may be slightly larger than the central aperture 16 of element 15 and an outside diameter which is preferably somewhat less than the outside diameter of element 15. Washer 25 may, if desired, be bonded to the bearing surface 17 of element 15 and manufactured as a unit so that a washer having optimum dimensions will be integrally associated with element 15.

A nut 27 is threadedly disposed on bolt 7 for engagement with washer 25 so as to securely fasten liner member 6 and to transmit a compressive force to sealing element 15.

When a wet grinding operation is performed with a comminuting mill of the type to which the present invention is applicable, the casing of the mill will be partially filled with water. The mill is provided with a quantity of loosely disposed balls or rods which are caused to cascade and roll about within the mill, for impact and grinding effect on material to be ground in the casing, by either rotating or vibrating the casing about its axis. The liner members 6 and bolts 7 are thus subjected to the impact effect of the balls or rods and as a result are continuously jarred and thereby caused to be displaced slightly relative to the casing 5. The displacement of bolts 7 relative to casing 5 gives rise to a sealing problem in that rapid rotation or vibration of casing 5 causes the liquid therein to exert a pressure in the region of the casing holes 9. It is this sealing problem to which the present invention pertains.

Figures 2, 3:
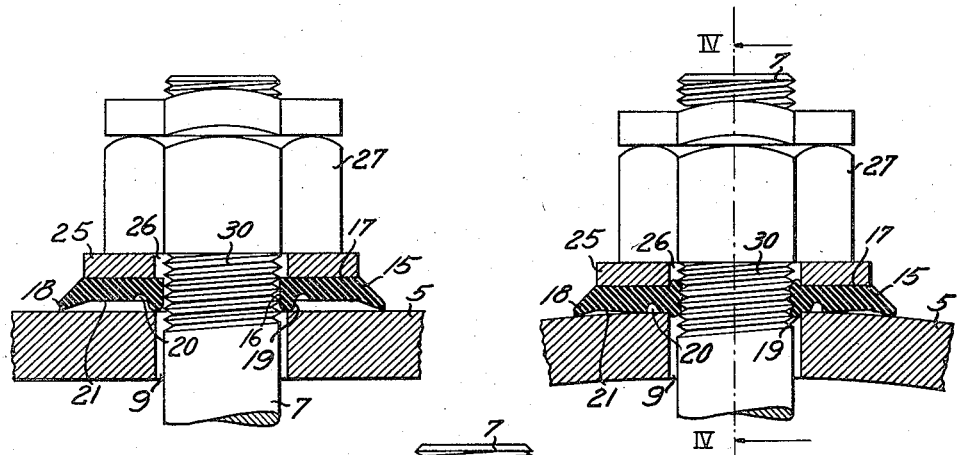
Fig. 2 is a vertical, longitudinal, sectional view of the casing portion of Fig. 1 showing the sealing element in unconfined relation to a bolt and bolt hole.
Fig. 3 is a vertical, transverse, sectional view of the casing portion of Fig. 1 showing the sealing element in confined sealing engagement with a bolt and bolt hole.
Figure 4:
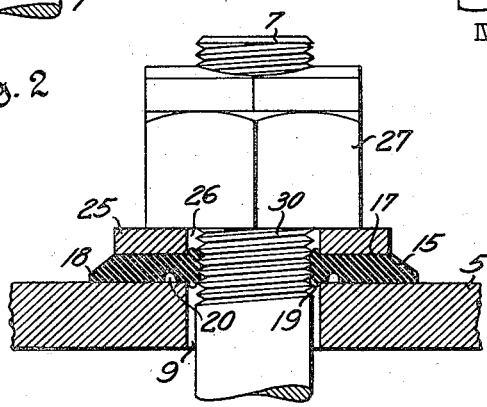
Fig. 4 is a vertical transverse section taken on line IV—IV of Fig. 3.

Comparing the uncompressed shape of element 15 in Fig. 2 and its compressed shape in Figs. 1, 3 and 4 it is seen that the axial force transmitted by washer 25 causes annular ridge 19 to forcibly engage threads 30 of bolt 7 in fluid sealing relation. The function of annular recess 20 at this point is to provide a closely adjacent space or reservoir into which the excess rubber or like material in annular ridge 19 can flow after a sealing contact has been made with threads 30 of bolt 7. Flat annular bearing surface 21 is pressed against the surface of casing 5 and prevents leakage in a radially outward direction.

The sealing engagement of annular ridge 19 with threads 30 of bolt 7 is thereby not affected when bolt 7 is displaced relative to casing 5. When the excess rubber is forced into annular recess 20 there is created a certain amount of potential, resilient energy which exerts a constant force to maintain annular ridge 19 in engagement with bolt threads 30.

Peripheral downwardly extending skirt portion 18 is capable of conforming to the curvature of a cylindrical or conical casing. Figs. 1 and 3 show the curvature of casing 5 and it is seen that the entire periphery of skirt portion 18 is in sealing engagement with casing 5 whereas the radially outward portion of annular surface 21 does not engage the casing in those views. In certain applications of the present invention, however, skirt portion 18 may be omitted. An example of such application would be in the case of a large diameter tank where the surface engaged by sealing element 15 would be relatively flat.

It will be understood that, while a specific embodiment of this invention has been described and illustrated, the invention will be understood to include all such modifications and equivalents as may be readily apparent to persons skilled in the art to which it appertains within the scope of the appended claims.

It is claimed and desired to secure by Letters Patent:

1. A resilient annular washer comprising an annular main portion presenting oppositely facing first and second annular planar surfaces perpendicular to the axis of said washer, an annular inner portion joining said main portion at the inner periphery thereof, said inner portion presenting an annular recess disposed in adjacent contiguous relation to said first planar surface and presenting an annular ridge disposed radially inward of said recess at the inner periphery of said washer and extending axially outward beyond said first planar surface of said main portion, and an annular outer portion joining said main portion at the outer periphery thereof and presenting a frusto-conical surface forming an angular and radially outward continuation of said first planar surface of said main portion, said frusto-conical surface extending axially outward from said first planar surface in the same direction as said annular ridge of said inner portion.

2. A resilient annular sealing element comprising an annular main portion presenting oppositely facing first and second annular planar surfaces perpendicular to the axis of said element, an annular inner portion joining said main portion at the inner periphery thereof, said inner portion presenting an annular recess disposed in adjacent contiguous relation to said first planar surface and presenting an annular ridge disposed radially inward of said recess at the inner periphery of said element and extending axially outward beyond said first planar surface of said main portion, and an annular outer portion joining said main portion at the outer periphery thereof and presenting first and second outwardly converging frusto-conical surfaces forming angular continuations of said first and second planar surfaces, respectively, and said outer portion presenting a peripheral terminal edge which is axially offset from said first planar surface in the same direction as said annular ridge of said inner portion.

References Cited in the file of this patent

UNITED STATES PATENTS

| | | |
|---|---|---|
| 326,345 | Taylor | Sept. 15, 1885 |
| 1,315,025 | Lawler | Sept. 2, 1919 |
| 1,356,404 | Robinson | Oct. 19, 1920 |
| 1,969,640 | Curtin | Aug. 7, 1934 |
| 2,208,620 | Baisch | July 23, 1940 |
| 2,383,570 | Sellew | Aug. 28, 1945 |